(12) United States Patent
King et al.

(10) Patent No.: US 12,618,469 B1
(45) Date of Patent: May 5, 2026

(54) PARK LOCK ACTUATOR WITH MANUAL RELEASE AND SHIPPING POSITION

(71) Applicant: Stoneridge Control Devices, Inc., Novi, MI (US)

(72) Inventors: Yulanda King, Amherst, NY (US); Harish Chowdhary Athipatla, Canton, MI (US)

(73) Assignee: STONERIDGE CONTROL DEVICES, INC., Novi, MI (US)

( * ) Notice: Subject to any disclaimer, the term of this patent is extended or adjusted under 35 U.S.C. 154(b) by 0 days.

(21) Appl. No.: 19/022,730

(22) Filed: Jan. 15, 2025

(51) Int. Cl.
F16H 63/34 (2006.01)

(52) U.S. Cl.
CPC .................................. F16H 63/3491 (2013.01)

(58) Field of Classification Search
CPC .................................................... F16H 63/3491
See application file for complete search history.

(56) References Cited

U.S. PATENT DOCUMENTS

| | | | |
|---|---|---|---|
| 9,970,543 | B2 | 5/2018 | Jeon et al. |
| 10,955,051 | B2 | 3/2021 | Jeon et al. |

| | | | | |
|---|---|---|---|---|
| 2016/0245404 | A1* | 8/2016 | Barclay | .............. F16H 63/3491 |
| 2018/0320787 | A1* | 11/2018 | Ljulj | ................... F16H 63/3491 |
| 2020/0173553 | A1 | 6/2020 | Gausrab et al. | |

FOREIGN PATENT DOCUMENTS

| | | |
|---|---|---|
| CN | 116221399 A | 6/2023 |
| JP | 2017166647 A | 9/2017 |
| KR | 100893031 B1 | 4/2009 |
| KR | 1020160052154 A | 5/2016 |

OTHER PUBLICATIONS

International Search Report and Written Opinion for International Application No. PCT/US2025/011725 mailed Oct. 15, 2025.

* cited by examiner

*Primary Examiner* — Lori Wu

(74) *Attorney, Agent, or Firm* — Carlson, Gaskey & Olds, P.C.

(57) ABSTRACT

An actuator is manually released by lifting the handle relative to at least one detent to translate a release shaft along its axis, wherein the lifting step selectively positions an end of the release shaft in a first desired axial position relative to one of a gear train and an output shaft. The handle can be rotated relative to at least one detent to rotate the release shaft about its axis to one of the at least three positions. The handle may be released to translate the release shaft along its axis and position an end of the release shaft in a second desired axial position relative to the one of the gear train and the output shaft. The end of the release shaft is maintained in the desired position in the second desired axial position.

18 Claims, 5 Drawing Sheets

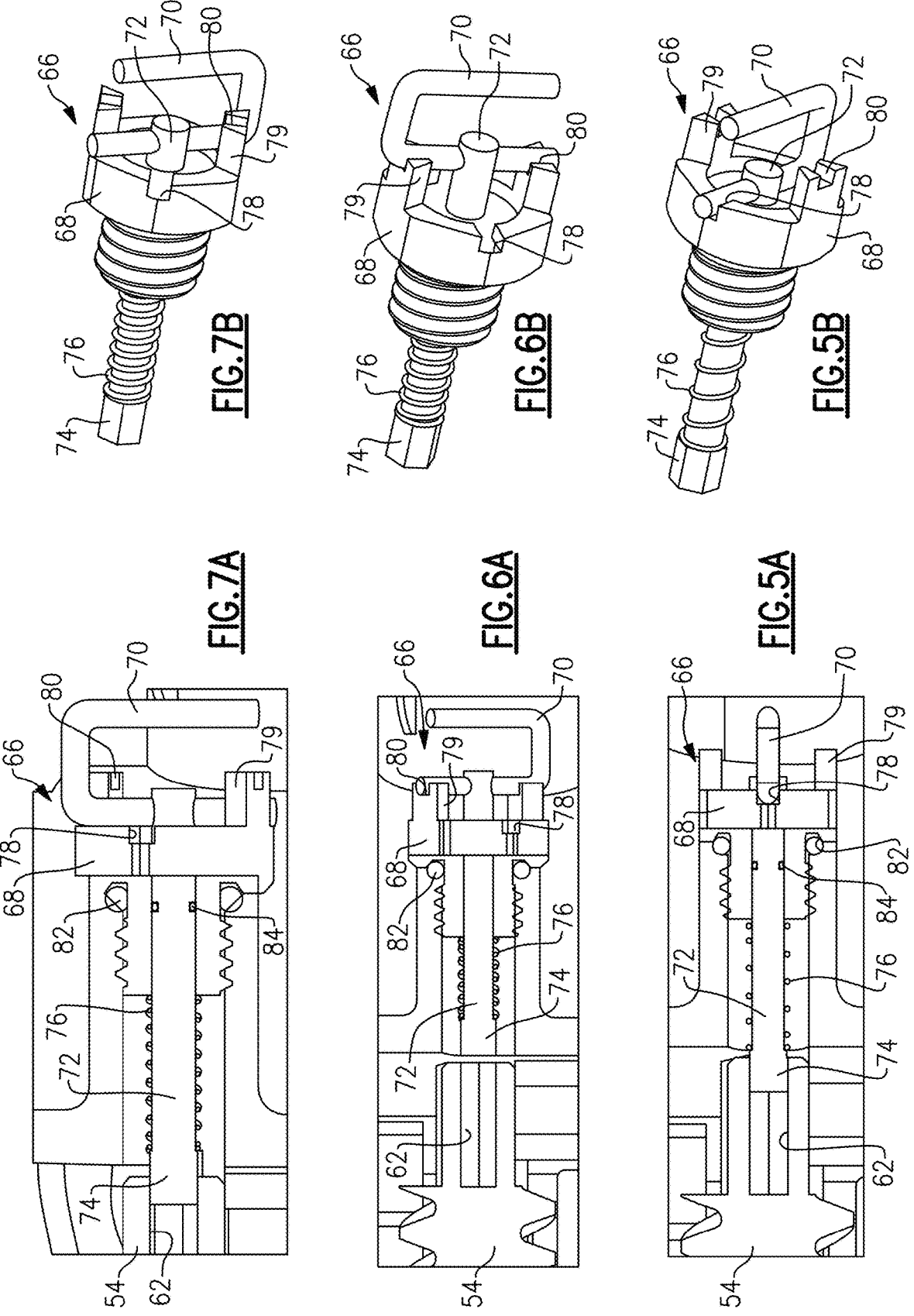

POSITION 3B

POSITION 2

66

80

POSITION 1

78

79

70

POSITION 3A

40

66

22

62

116

PARK LOCK ACTUATOR WITH MANUAL RELEASE AND SHIPPING POSITION

BACKGROUND

The disclosure relates to an actuator for use in a vehicle driveline, for example, a park lock actuator for use in locking a transmission and/or differential to prevent the vehicle from moving when parked.

Park lock actuators are two-position devices used to lock and unlock a vehicle driveline component. During vehicle operation, the park lock actuator is unlocked, permitting the driveline to impart rotational drive from a power source to the vehicle's wheels. When the vehicle is parked and not operating, the park lock actuator either manually or automatically engages to lock the driveline component and prevent movement of the vehicle.

One type of park lock actuator is driven by an electric motor in response to a switch and/or controller. In the event of a loss of power or access to the input for operating the actuator, a manual release is provided on the actuator outside the vehicle so the vehicle can be towed. External tools are typically required to manual release the actuator.

SUMMARY

In one exemplary embodiment, a method of manually releasing an actuator that has a housing mounted to a vehicle driveline component, the method includes a) manipulating a handle that is mounted to a release shaft between one of at least three positions, which include an actuator installation position, an actuator operating position and an actuator release position. The handle manipulating step includes a1) lifting the handle relative to at least one detent to translate the release shaft along its axis, the lifting step selectively positions an end of the release shaft in a first desired axial position relative to one of a gear train and an output shaft, a2) rotating the handle relative to at least one detent to rotate the release shaft about its axis to one of the at least three positions, and a3) releasing the handle to translate the release shaft along its axis and position an end of the release shaft in a second desired axial position relative to the one of the gear train and the output shaft. The method also includes b) maintaining the end of the release shaft in the desired position in the second desired axial position.

In a further embodiment of any of the above, step a) is performed directly with a user's hand and without an intervening tool.

In a further embodiment of any of the above, step a1) includes pulling the handle away from the actuator housing.

In a further embodiment of any of the above, the end is selectively engaged with and disengaged from the one of the gear train and the output shaft.

In a further embodiment of any of the above, the end is spaced from and disengaged from the one of the gear train and the output shaft in the actuator operating position. A gap is provided between the end and the one of the gear train and the output shaft.

In a further embodiment of any of the above, the method includes a step of manually releasing the actuator, step a2) includes rotating the handle to a protrusion, and includes the steps of a2.1) lifting the handle above the protrusion, a2.2) rotating the handle past the protrusion, step a3) includes engaging the one of the gear train and the output shaft with the end of the release shaft, and step c) includes continuing to rotate the handle with the end of the release shaft engaged with the one of the gear train and the output shaft.

In a further embodiment of any of the above, the at least one detent includes first and second detents respectively provided at first and second angular positions that provide different angular clocking of the release shaft than one another. The first detent corresponds to a one of the at least three positions, and the second dent corresponds to another of the at least three positions.

In a further embodiment of any of the above, the at least three positions each correspond to different axial positions of the shaft.

In another exemplary embodiment, an actuator for a vehicle driveline component includes a motor, a housing, a gear train that is arranged in the housing and coupled to the motor, an output shaft that is arranged in the housing and coupled to the gear train. The output shaft is configured to move between multiple positions in response to rotational drive from the motor via the gear train. The output shaft is configured to be operatively connected to the vehicle driveline component. The actuator further includes a manual release assembly that includes at least three positions, including an actuator installation position in which the manual release assembly is operatively coupled to the output shaft such that the output shaft is fixed in a clocked orientation to mate with the vehicle driveline component when installing the actuator onto the driveline component, an actuator operating position in which the manual release assembly is decoupled from the output shaft and gear train to permit rotation of the output shaft in response to the motor via the gear train, an actuator release position in which the manual release assembly is operatively coupled to the output shaft to permit rotation of the output shaft via the manual release assembly, and the first, second and third positions are different than one another.

In a further embodiment of any of the above, the manual release assembly includes a head that is secured to the housing, a release shaft from an end internal to the housing and an opposing end external to the housing, the release shaft is slidably supported by the head for translation along and rotation about an axis of the release shaft, and a handle that is supported at the opposing end.

In a further embodiment of any of the above, the actuator includes a spring that is arranged between the internal end and the head. The spring is configured to bias the internal end toward the one of the gear train and the output shaft.

In a further embodiment of any of the above, the actuator includes first and second seals. The first seal is arranged between and engages the head and the housing, and the second seal is arranged between and engages the head and the release shaft.

In a further embodiment of any of the above, the head is threadingly secured to the housing.

In a further embodiment of any of the above, the head includes first and second detents located at different angular positions relative to one another with respect to the release shaft axis. The handle is seated in the first detent in one of the three positions, and the handled seated in the second detent in another of the three positions.

In a further embodiment of any of the above, the handle is in neither of the first and second detents in the actuator release position.

In a further embodiment of any of the above, one of the first and second detents is axially raised relative to the other of the first and second detents.

In a further embodiment of any of the above, the motor has a pinion, and the gear train includes multiple gear reduction sets. The gear train includes a worm. The gear train and the motor are non-back-drivable in response to an input at the output shaft, and the end of the release shaft is configured to selectively cooperate with the worm.

In a further embodiment of any of the above, the motor has a pinion, and the gear train includes multiple gear reduction sets. The gear train and the motor are back-drivable in response to an input at the output shaft.

In a further embodiment of any of the above, a vehicle driveline includes the actuator. The driveline component is an axle.

In a further embodiment of any of the above, a vehicle driveline includes the actuator. The driveline component is a transmission.

In another exemplary embodiment, a method of manually releasing an actuator mounted to a vehicle driveline component, the method includes removing a plug from a hole in an actuator housing to expose a drive assembly feature, inserting a tool through the hole engage the drive assembly feature, and rotating the drive assembly feature to rotate an output shaft coupled to the vehicle driveline component.

BRIEF DESCRIPTION OF THE DRAWINGS

The disclosure can be further understood by reference to the following detailed description when considered in connection with the accompanying drawings wherein:

FIGS. 5A and 5B illustrate a manual release assembly in a first position.

FIGS. 6A and 6B illustrate a manual release assembly in second first position.

FIGS. 7A and 7B illustrate a manual release assembly in a third position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
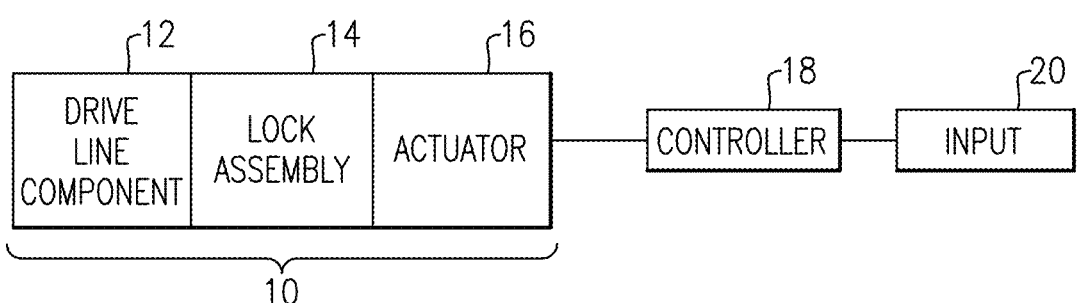
FIG. 1A is a schematic view of a vehicle gear train including the disclosed actuator.

FIG. 1A illustrates a gear train 10 having a driveline component 12 such as a transmission, driveshaft, differential or axle. The driveline component imparts drive from the vehicle's propulsion system to the wheels. One type of gear train 10 includes a lock assembly 14 that moves between locked and unlocked positions to permit rotation of the driveline component during vehicle operation and lock out any rotation when the vehicle is parked to prevent the vehicle from rolling. The lock assembly 14 is operated by an actuator 16 that receives an electrical signal from a controller 18 and/or an input 20 such as a switch. Although the disclosed actuator is described as being used in a 2-position park-lock system, it should be understood that the actuator may have other applications and operate in more than two positions for those applications.

Figure 1B:
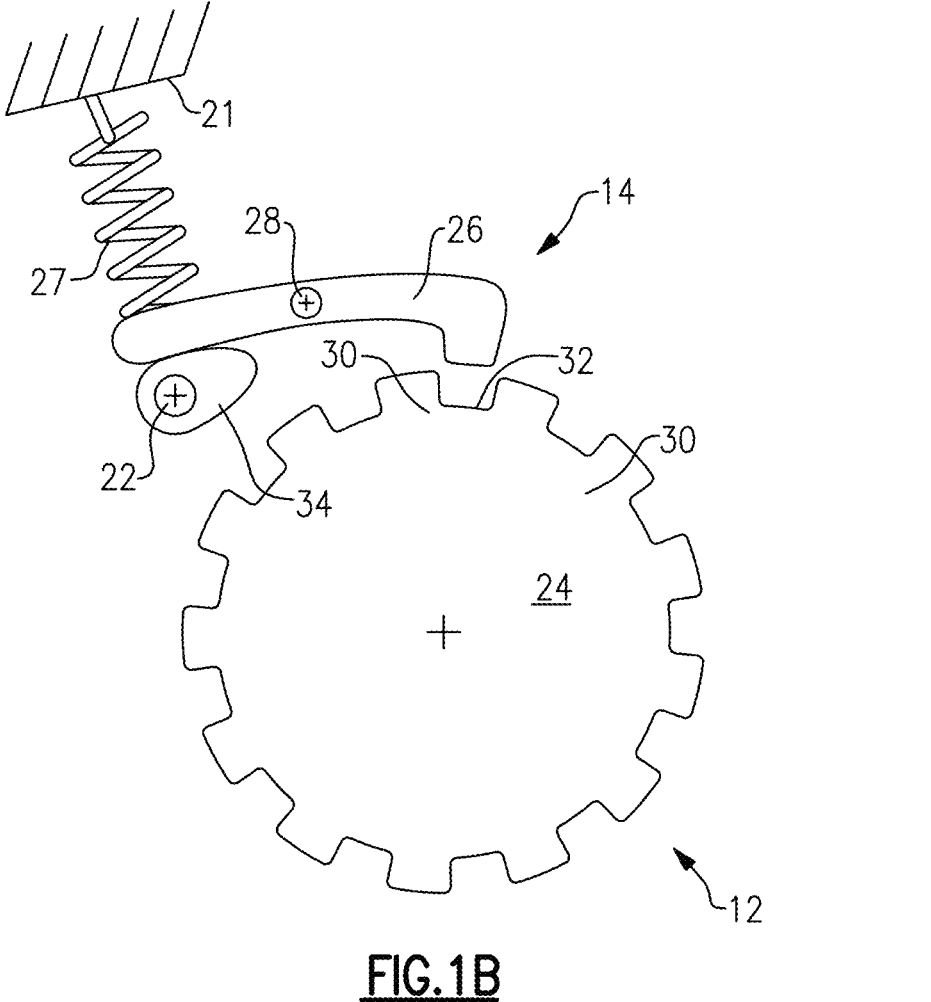
FIG. 1B is a schematic view of one type of park lock device.

Referring to FIG. 1B, an example lock assembly 14 is shown. However, it should be understood that the illustrated lock assembly 14 is highly schematic and may be configured differently than shown. In the example, the driveline component 12 includes a locking gear 24 mounted to a component, such as a transmission output shaft. The locking gear 24 includes circumferentially spaced apart teeth 30 forming circumferentially spaced apart notches 32. A parking pawl 26 is movable about a pivot 28 to selectively cooperate with the notches 32. A spring 27 is shown illustrated between a transmission housing 21 and the parking pawl 26 to bias the pawl 26 to a normally unlocked position. An output shaft 22 from the actuator 16 rotationally drives a cam 34 that cooperates with the pawl 26 to move the pawl to a locked position in which its claw is seated within the notch 32, preventing rotation of the locking gear 24 and thus the driveline component 12.

Figure 2:
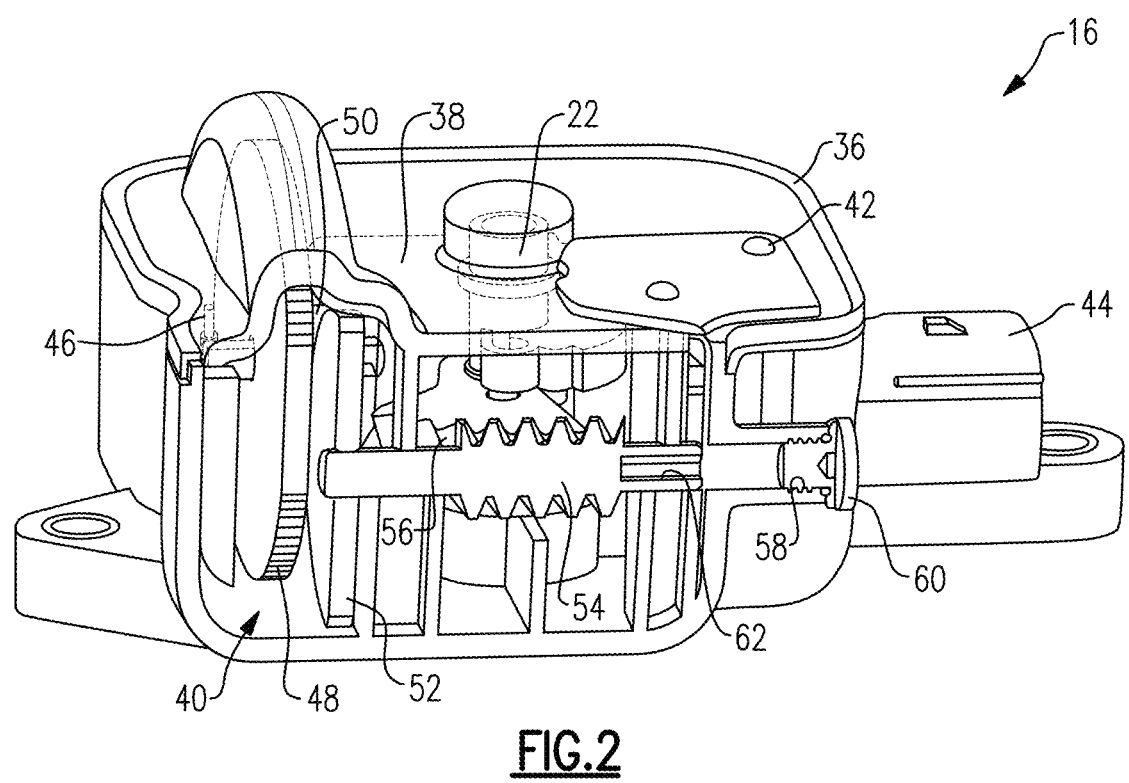
FIG. 2 is a partial cross-sectional, phantom view of one example actuator with a first gear train.

Referring to FIG. 2, the example actuator 16 is not back-drivable since the gear train 40 includes a worm 54. An electric motor 38 and the gear train 40 is arranged within the housing 36. In the example, a printed circuit board (PCB) 42 is also arranged within the housing 36 and may provide control logic and/or position verification relating to an ultimate position of the output shaft 22. The motor 38 and PCB 42 are electrically connected to an electrical connector 44.

In the example, the gear train 40 includes first through sixth gears 46-56. More or fewer gears may be used, and the gears may be differently than shown for packaging reasons or torque requirements. The first gear 46 is a pinion providing an output gear driven by the electrical motor 38. The first gear 46 meshes with a second gear 48 of a compound gear that drives a third gear 50, which meshes with a fourth gear 52. The fourth gear 52 rotationally drives a fifth gear 54, which is a worm gear. The worm gear 54 drives the sixth 56 sector gear that is mounted to the output shaft 22.

Because a worm gear is used in the gear train 40, the gear train 40 is non-back drivable. Thus, in order to rotate the output shaft 22 via the gears, the worm gear 54 or a gear upstream from the worm gear must be manually driven. In the example shown, the housing 36 includes a threaded hole 58 that receives a removable plug 60. In the event of a power loss or actuator malfunction, the plug 60 is removed to expose a drive assembly feature, such as socket 62 in the worm gear 54. A tool, such as an Allen wrench, may be inserted through the hole 58 and seated in the socket 62 such that the worm gear 54 may be rotated, which in turn rotates the output shaft 22 via the sector gear 56. Rotation of the output shaft 22 unlocks the locking assembly 14.

Figure 3:
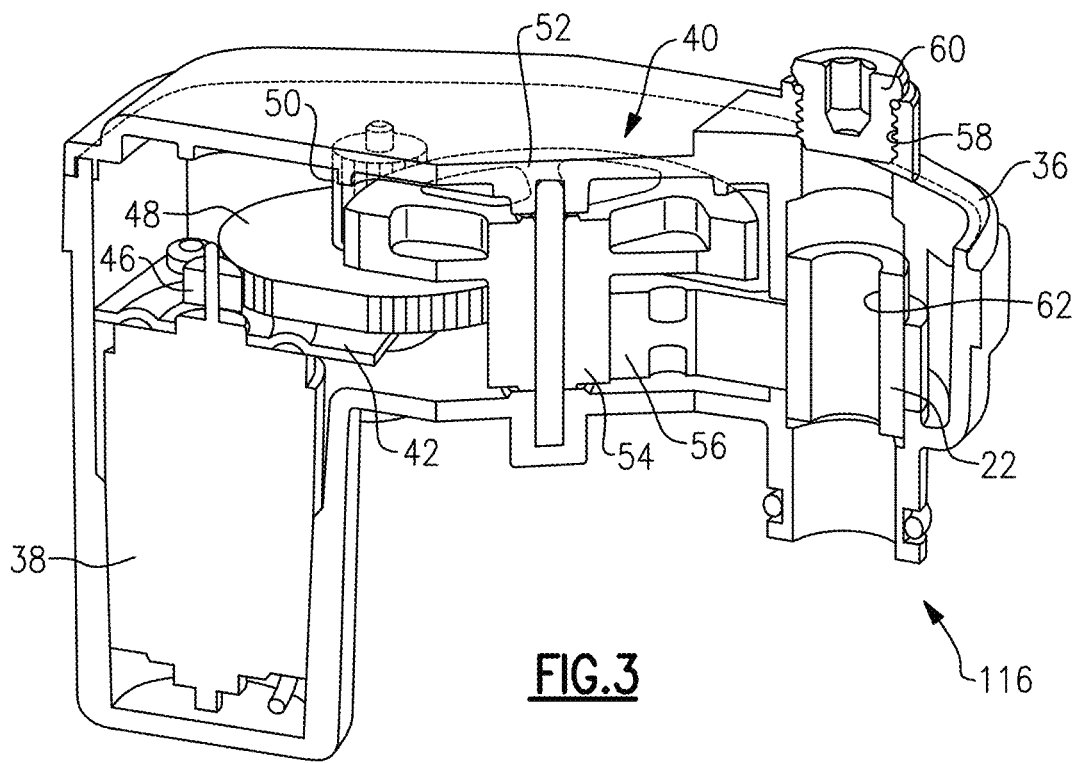
FIG. 3 is a partial cross-sectional, phantom view of a second example actuator with a first gear train.

FIG. 3 illustrates another example actuator 116 having a back drivable gear train that does not include a worm gear. The same numbers are used in FIG. 3 as in FIG. 2 for example. In this example, the hole 58 and plug 60 are aligned with the socket 62, which is in the output shaft 22. The tool can directly mate with and rotate the output shaft 22 in this example, since the gear train 40 is back drivable.

Figure 4A:
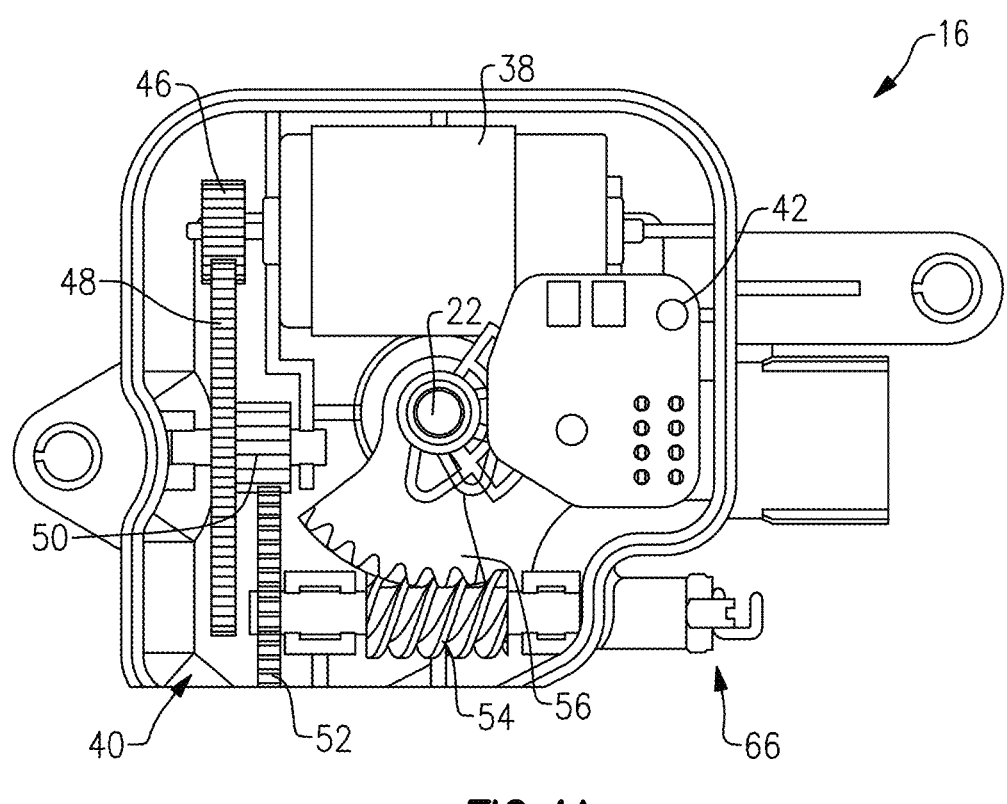
FIG. 4A is a cross-sectional view of the actuator shown in FIG. 2.
Figure 4B:
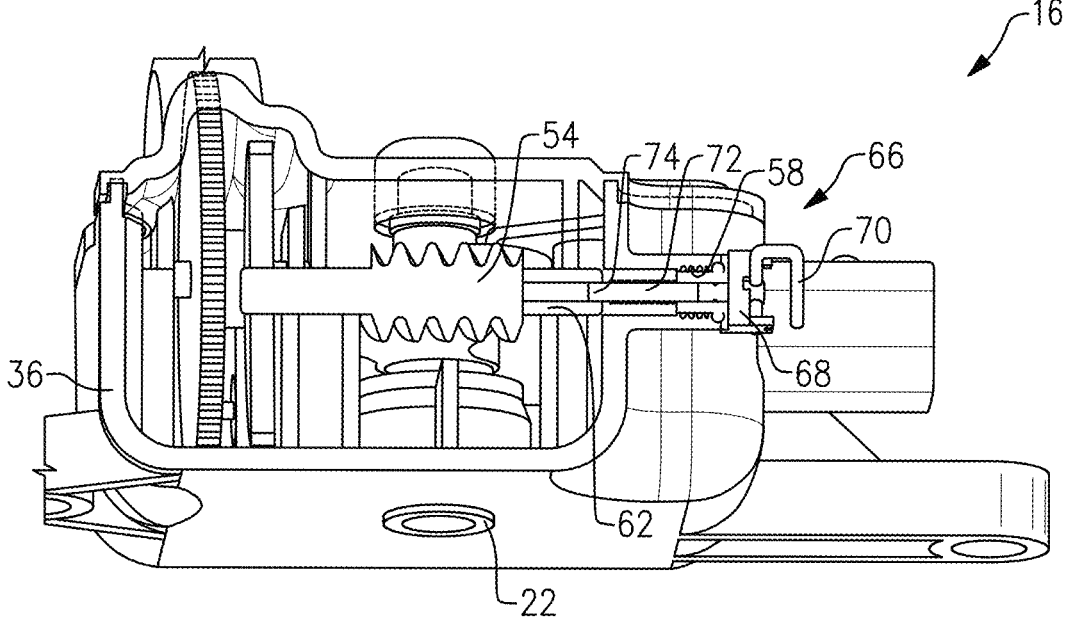
FIG. 4B is another cross-sectional view of the actuator shown in FIG. 2.
Figure 8:
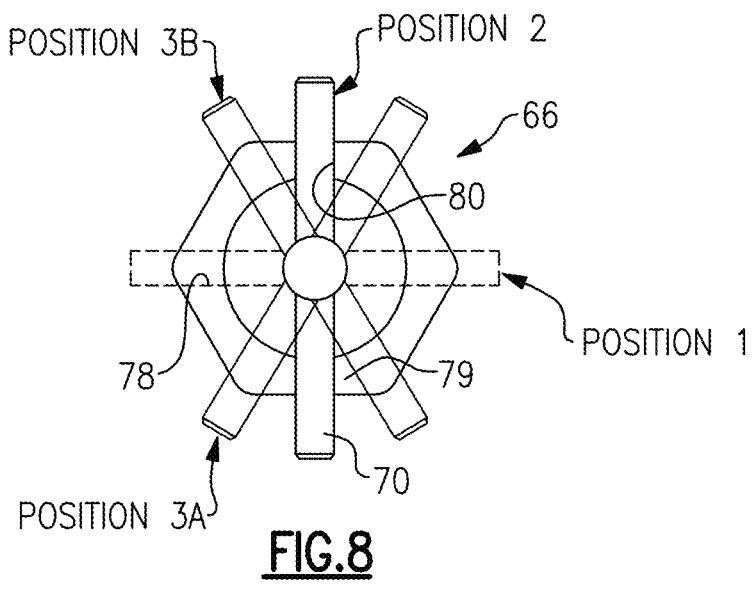
FIG. 8 illustrates the manual release assembly in the three positions shown in FIGS. 5A-7B.

FIGS. 4A and 4B illustrate the actuator 16 shown in FIG. 2 with a manual release assembly 66 rather than the plug 60. Referring to FIG. 4B, the manual release assembly 66 includes a head 68, which may be hexagonal in shape to facilitate it being secured to the housing 36, threadingly secured within the hole 58, for example. The head 68 slidingly supports a release shaft 72 that is both axially and rotatably movable relative to the head 68 about its axis in response to an input from a handle 70. The handle 70 can be manipulated by hand by a user (without the need of any intervening tool), such as a mechanic, tow truck driver or factory worker. In the example, the handle 70 is pivotably secured to an outer end of the release shaft 72, so that the handle 70 can be folded down and out of the way when not in use. Opposite the handle 70 is an internal end 74 of the release shaft 72 that selectively cooperates with the socket 62 in the worm gear 54, in the example shown.

In the example, the handle 70 is manipulated relative to the head 68 to both axially and rotationally to selectively move the release shaft 72 relative to the socket 62 between at least three positions, shown in FIGS. 5A-8. The head 68 includes first and second detents 78, 80 located at different angular positions relative to one another with respect to the release shaft axis. The second detent(s) 80 are elevated or raised on protrusions 79 relative to the first detent(s) 78. The handle 70 is seated in the first detent 78 in one of the three positions (FIGS. 5A-5B), and the handle 70 is seated in the second detent 80 in another of the three positions (FIGS. 6A-6B).

Referring to FIGS. 5A and 5B, a spring 76 is arranged between the end 74 and the head 68 to bias the end 74 axially inward toward the socket 62. A first seal 82 is provided between the head 68 and the housing 36, and a second seal 84 is provided between the release shaft 72 and the head 68. The first and second seals 82, 84 prevent water and debris from entering the actuator 16.

With continuing reference to FIGS. 5A and 5B, the head 68 includes a first detent 78 defining a first position (actuator installation position) in which the handle is seated within the first detent 78. In this first position, the release shaft 72 is in a first axial position and a first angular position, resulting in the end 74 being received in the socket 62. Since the handle 70 is received within the first detent 78, the release shaft 72 is angularly constrained against rotation, which in turn fixes the worm gear 54 against rotation. This prevents the output shaft 22 from rotating. The first position is used to clock the output shaft to an installation orientation that permits the customer to install the actuator 16 onto the driveline component 12.

The manual release assembly 66 is shown in a second position (actuator operating position) in FIGS. 6A and 6B, provided by a second axial position and second angular position of the release shaft 72. The head 68 includes opposing protrusions 79 providing second detents 80 that are axially elevated relative to the first detent 78. With respect to the first position, after installation of the actuator 16 onto the driveline component, the handle 70 is pulled on to disengage the end 74 from the socket 62, decoupling them from one another. The handle 70 is then angularly rotated so that the handle 70 can be seated in the second detents 80. In this position, there is a gap between the end 74 and the worm gear 54, permitting it to rotate relative to the release shaft 72. In the second position, the actuator 16 is permitted to operate normally in response to input from the motor 38.

A third position (actuator release position) is shown in FIGS. 7A and 7B. In the third position, the handle 70 is seated in neither of the first and second detents 78, 80. The end 74, however, will be received within the socket 62 at least initially, although not to the same degree as in the first position. Nonetheless, rotation of the release shaft 72 will in turn rotate the worm gear 54. The handle 70 can be rotated between the protrusions 79. If additional rotation of the release shaft 72 and the worm gear 54 is desired, the handle 70 may be pulled upon further to lift the handle 70 over the protrusion(s) 79, subsequently inserting the end 74 back into the socket 62, then continuing rotation of the release shaft 72. As can be appreciated by reference to the second position, the release shaft 72 will temporarily disengage the socket 62 until the end 74 reaches an angular position in which the end 74 is again aligned with the socket 62, permitting insertion of the end 74. In this manner, the release shaft 72 can be rotated in either direction as much as desired to change the angular position of the output shaft 22.

Figure 9:
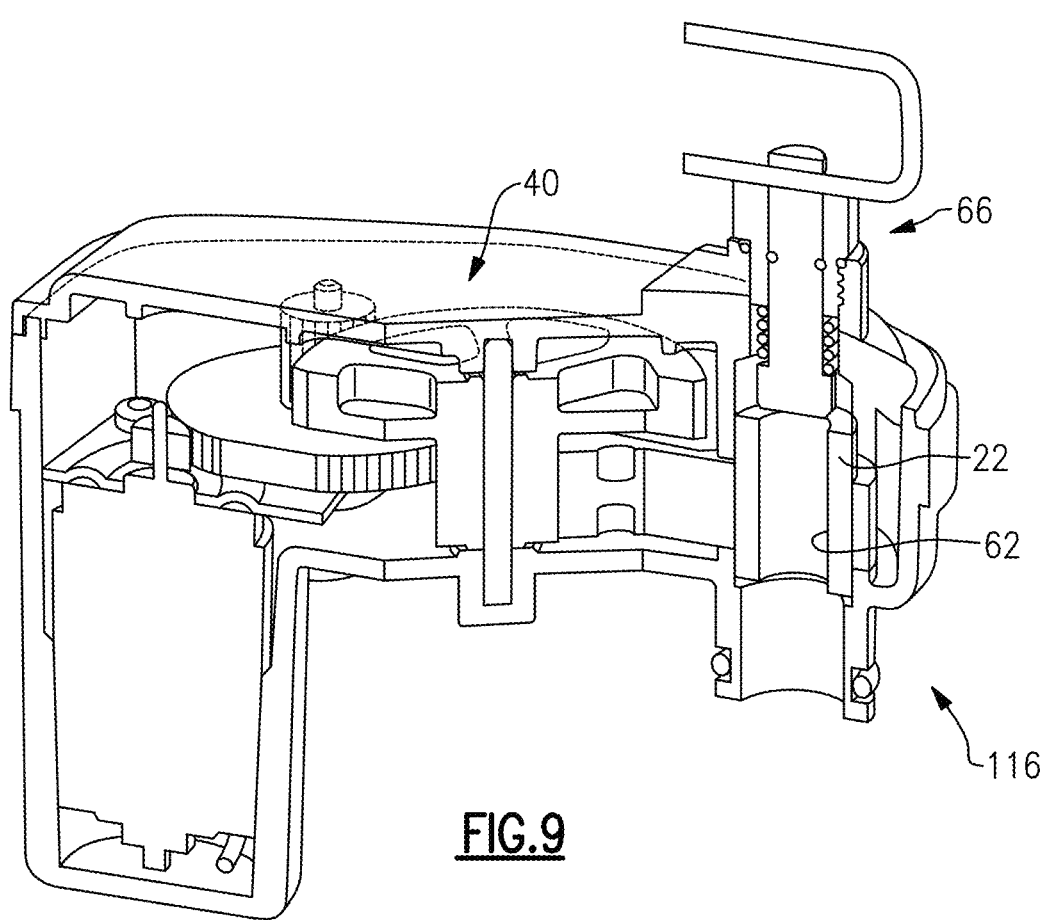
FIG. 9 depicts the manual release assembly for the second actuator shown in FIG. 3.

The back drivable version of the actuator 116 is shown in FIG. 9 with the manual release assembly 66 described above. In this example, the manual release assembly 66 cooperates with a socket 62 in the output shaft 22, but otherwise operates as described above.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of manually releasing an actuator having a housing mounted to a vehicle driveline component, the method comprising:

a) manipulating a handle that is mounted to a release shaft between one of at least three positions in which the release shaft is assembled within the housing, which include an actuator installation position, an actuator operating position and an actuator release position, wherein the handle manipulating step includes:

a1) lifting the handle relative to at least one detent from outside the actuator to translate the release shaft along its axis, wherein the lifting step selectively positions an end of the release shaft in a first desired axial position relative to one of a gear train and an output shaft;

a2) rotating the handle relative to at least one detent to rotate the release shaft about its axis to one of the at least three positions; and a3) releasing the handle to translate the release shaft along its axis and position an end of the release shaft in a second desired axial position relative to the one of the gear train and the output shaft; and b) maintaining the end of the release shaft in the desired position in the second desired axial position.

2. The method of claim 1, wherein step a) is performed directly with a user's hand and without an intervening tool.

3. The method of claim 1, wherein step a1) includes pulling the handle away from the actuator housing.

4. The method of claim 1, wherein the at least one detent includes first and second detents respectively provided at first and second angular positions that provide different angular clocking of the release shaft than one another, the handle received in the first detent corresponding to a one of the at least three positions, and the handle received in the second detent corresponding to another of the at least three positions, wherein the at least three positions each correspond to different axial positions of the release shaft in which the release shaft is held in place by one of three detents, which include the first, second and third detents.

5. A method of manually releasing an actuator having a housing mounted to a vehicle driveline component, the method comprising:

a) manipulating a handle that is mounted to a release shaft between one of at least three positions, which include an actuator installation position, an actuator operating position and an actuator release position, wherein the handle manipulating step includes:

a1) lifting the handle relative to at least one detent to translate the release shaft along its axis, wherein the lifting step selectively positions an end of the release shaft in a first desired axial position relative to one of a gear train and an output shaft;

a2) rotating the handle relative to at least one detent to rotate the release shaft about its axis to one of the at least three positions; and a3) releasing the handle to translate the release shaft along its axis and position an end of the release shaft in a second desired axial position relative to the one of the gear train and the output shaft; and b) maintaining the end of the release shaft in the desired position in the second desired axial position; and comprising a step of manually releasing the actuator wherein step a2) includes rotating the handle to a protrusion, and comprising the steps of a2.1) lifting the handle above the protrusion, a2.2) rotating the handle past the protrusion, step a3) includes engaging the one of the gear train and the output shaft with the end of the release shaft, and comprising step c) includes continuing to rotate the handle with the end of the release shaft engaged with the one of the gear train and the output shaft.

6. The method of claim 5, wherein the end is selectively engaged with and disengaged from the one of the gear train and the output shaft.

7. The method of claim 6, wherein the end is spaced from and disengaged from the one of the gear train and the output shaft in the actuator operating position, wherein a gap is provided between the end and the one of the gear train and the output shaft.

8. An actuator for a vehicle driveline component, comprising:

a motor;

a housing;

a gear train arranged in the housing and coupled to the motor;

an output shaft arranged in the housing and coupled to the gear train, the output shaft configured to move between multiple positions in response to rotational drive from the motor via the gear train, the output shaft configured to be operatively connected to the vehicle driveline component; and a manual release assembly comprising at least three positions, including:

an actuator installation position in which the manual release assembly is operatively coupled to the output shaft such that the output shaft is fixed in a clocked orientation to mate with the vehicle driveline component when installing the actuator onto the driveline component;

an actuator operating position in which the manual release assembly is decoupled from the output shaft and the gear train to permit rotation of the output shaft in response to the motor via the gear train;

an actuator release position in which the manual release assembly is operatively coupled to the output shaft to permit rotation of the output shaft via the manual release assembly; and wherein the first, second and third positions are different than one another; and wherein the manual release assembly includes:

a head secured to the housing;

a release shaft from an end internal to the housing and an opposing end external to the housing, the release shaft slidably supported by the head for translation along and rotation about an axis of the release shaft; and a spring arranged between the internal end and the head, the spring configured to bias the internal end toward the one of the gear train and the output shaft.

9. The actuator of claim 8, wherein the manual release assembly includes:

a handle supported at the opposing end.

10. The actuator of claim 9, wherein the motor has a pinion, and the gear train includes multiple gear reduction sets, the gear train includes a worm, the gear train and the motor are non-back-drivable in response to an input at the output shaft, and the end of the release shaft is configured to selectively cooperate with the worm.

11. The actuator of claim 8, comprising first and second seals, wherein the first seal is arranged between and engaging the head and the housing, and the second seal is arranged between and engaging the head and the release shaft.

12. The actuator of claim 11, wherein the head is threadingly secured to the housing.

13. The actuator of claim 8, wherein the head includes first and second detents located at different angular positions relative to one another with respect to the release shaft axis, the handle seated in the first detent in one of the three positions, and the handled seated in the second detent in another of the three positions.

14. The actuator of claim 13, wherein the handle is in neither of the first and second detents in the actuator release position.

15. The actuator of claim 13, wherein one of the first and second detents is axially raised relative to the other of the first and second detents.

16. The actuator of claim 8, wherein the motor has a pinion, and the gear train includes multiple gear reduction sets, the gear train and the motor are back-drivable in response to an input at the output shaft.

17. A vehicle driveline including the actuator of claim 8, wherein the driveline component is an axle.

18. A vehicle driveline including the actuator of claim 8, wherein the driveline component is a transmission.

* * * * *